Oct. 9, 1945.　　　　E. W. BISSON　　　　2,386,651
VARIABLE VOLTAGE DIVIDER
Filed Oct. 15, 1943
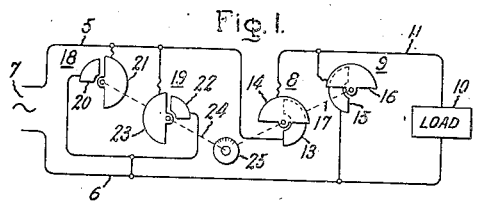
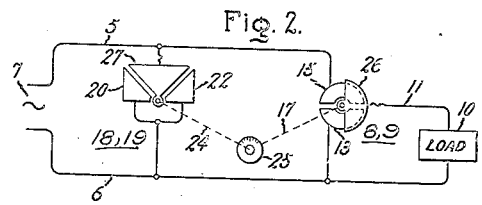
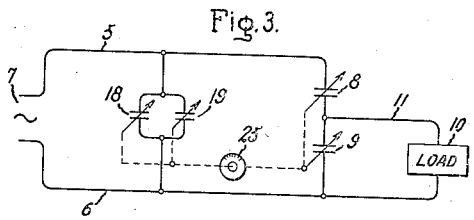
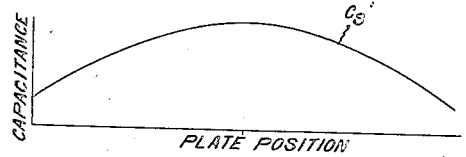
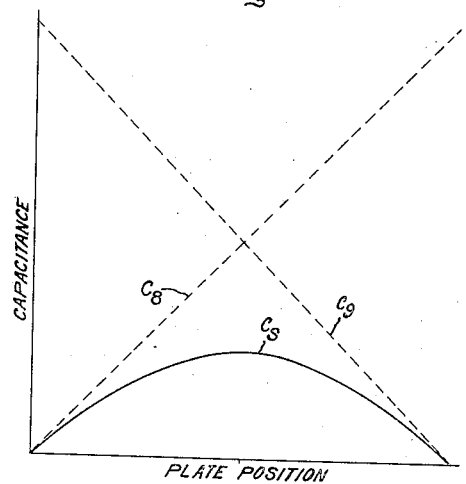
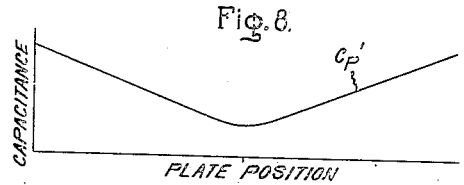
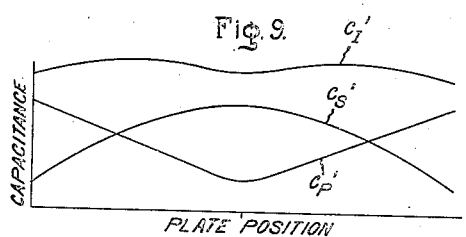
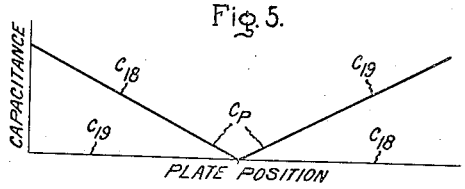
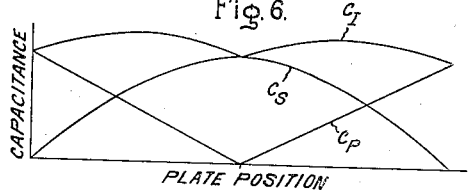
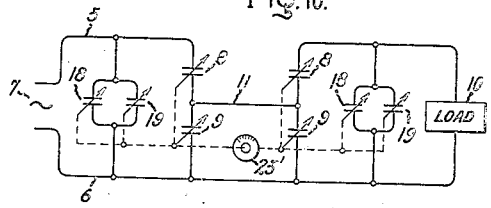
Inventor:
Ernest W. Bisson,
by Harris E. Dunham
His Attorney.

Patented Oct. 9, 1945

2,386,651

UNITED STATES PATENT OFFICE 2,386,651

VARIABLE VOLTAGE DIVIDER

Ernest W. Bisson, Albany, N. Y., assignor to General Electric Company, a corporation of New York Application October 15, 1943, Serial No. 506,397

5 Claims. (Cl. 178—44)

My invention relates to variable capacitive voltage dividers and has for its principal object the provision of a new and improved voltage divider of such type having a substantially constant total capacitance between line conductors.

Capacitive voltage dividers now commonly used comprise a pair of variable capacitors mechanically coupled for simultaneous capacity variation in opposite senses and so arranged that when the capacity of either capacitor is a minimum the capacity of the other capacitor is a maximum. Such an arrangement provides satisfactory voltage division, but has the disadvantage that the total line to line capacitance of the divider varies from zero, or some small minimum value, to a maximum and back to zero within the range of operation. In many applications such wide variation of line to line capacitance is undesirable, as in transmission line attenuators, or in balancing capacitors for direction finders and the like, or wherever it is desired to maintain the total input capacitance of the divider substantially equal to the characteristic impedance of a prescribed transmission line.

In accordance with my invention, the total input capacitance of a variable capacitive voltage divider is maintained substantially constant throughout its range of operation by connecting, in parallel with a pair of serially connected oppositely varying voltage dividing capacitors, a pair of parallel connected oppositely varying capacitors having a minimum combined capacitance in the region of the center of their range of capacity variation.

The nature of my invention itself will be more fully understood, and its objects and advantages further appreciated, by referring now to the following detailed specification taken in conjunction with the accompanying drawing, in which Fig. 1 is a partially schematic circuit diagram of a capacitive voltage divider embodying my invention; Fig. 2 is a partially schematic circuit diagram of another embodiment of my invention; Fig. 3 is a simplified schematic circuit diagram of the arrangements shown at Figs. 1 and 2; Figs. 4–9, inclusive, are graphical representations of certain of the electrical characteristics of the circuits shown at Figs. 1, 2, and 3; and Fig. 10 is a simplified schematic circuit diagram of still another embodiment of my invention.

Referring now to Fig. 1, I have shown a variable capacitive voltage divider comprising a pair of line conductors 5 and 6 coupled to a source of alternating current supply 7 and having connected therebetween in series circuit relation a pair of mechanically interconnected and oppositely variable capacitors 8 and 9. A voltage of variable intensity appears upon the directly connected plates of the capacitors 8 and 9 and is supplied to any desired electrical load 10 through a suitable variable voltage lead 11. In the embodiment of Fig. 1, the capacitors 8 and 9 are physically independent. The capacitor 8 comprises a stationary plate 13 and a moving plate 14, while the capacitor 9 similarly comprises stationary plate 15 and a moving plate 16. The moving plates 14 and 16 are mounted at spaced points upon a common rotatable shaft indicated at 17, and the stationary plates 13 and 15 are so disposed with respect to the associated moving plates 14 and 16, respectively, that when the capacitance of either capacitor is a maximum, the capacitance of the other capacitor is a minimum or zero. In the drawing the shaft 17 and the plates 14 and 16 are shown in the midposition of their range of movement.

Connected in parallel circuit relation with the serially connected capacitors 8 and 9, I provide a pair of parallel connected capacitors 18 and 19. The capacitor 18 comprises a stationary plate 20 and a moving plate 21, while the capacitor 19 comprises a stationary plate 22 and a moving plate 23. The moving plates 21 and 23 are mounted at spaced points upon a rotatable shaft 24, and the associated stationary plates 20 and 22 are so positioned that the capacitance of both capacitors 18 and 19 is a minimum, or substantially zero, when the shaft 24 is in its midposition, the capacitance of one capacitor increasing to its maximum as the shaft 24 is rotated to its limit of movement in one direction and the capacitance of the other capacitor increasing to a maximum as the shaft 24 is rotated to the limit of its movement in the opposite direction. In the illustrated embodiment of the invention, the shafts 17 and 24 have been shown mechanically interconnected and both controlled by a suitable manually operable control knob 25. It will of course be understood that, if desired, the moving plates 14, 16, 21, and 23 may all be mounted upon the same shaft.

At Fig. 2, I have shown another embodiment of my invention in which the capacitors 8 and 9 have been combined into a single structural unit having a common movable plate 26 and the capacitors 18 and 19 combined into another unitary structure having a common movable plate 27. In all other respects the arrangement of Fig. 2 is similar to that of Fig. 1 and like parts have been assigned the same reference numerals. I have also shown, at Fig. 3, a simplified circuit diagram in which the capacitors 8, 9, 18 and 19 and the mechanical interconnections therebetween are all shown only schematically. Electrically the circuit of Fig. 3 is the same as that of Figs. 1 and 2 and like parts have been assigned the same reference numerals.

With the foregoing understanding of the construction and arrangement of the various parts of my voltage divider, its mode of operation will now be understood by referring particularly to Figs. 3, 4, 5, and 6. At Fig. 4 the broken lines $C_8$ and $C_9$ illustrate, respectively, the manner of variation of the capacities of the capacitors 8 and 9 as the shaft 17 is moved from one limit of its movement to the other. Since the capacitors 8 and 9 are connected in series circuit relation, the sum of their capacities is expressed in the equation $$C_S = \frac{C_8 C_9}{C_8 + C_9}$$

where $C_S$ is the sum or series capacitance of the capacitors 8 and 9. The curve $C_S$ of Fig. 4 shows the manner in which the sum or series capacity $C_S$ varies as the shaft 17 is moved throughout its range of movement.

At Fig. 5, I have shown a similar diagrammatic representation of the manner in which the individual and sum capacities of the capacitors 18 and 19 vary as the shaft 24 is moved through its range of operation. From Fig. 5 it will be evident that the capacity $C_{18}$ of the capacitor 18 decreases substantially linearly from a maximum at one limit of movement of the shaft 24 to substantially zero at the midposition of the shaft and remains at zero as the shaft is moved from its mid position to the other limit of its range of movement. Similarly, the capacity $C_{19}$ of the capacitor 19 decreases substantially linearly from a maximum at this other limit of the range of movement of shaft 24 to substantially zero as the shaft is moved back to its mid position and remains at zero for all shaft positions at which the capacity $C_{18}$ is above zero. It may now be noted that the sum of the capacities of the capacitors 18 and 19 may be expressed as $C_P = C_{18} + C_{19}$ since these capacitors are connected in parallel circuit relation. $C_P$ is the parallel or sum capacity of the capacitors 18 and 19 and is represented at Fig. 5 by the heavy line $C_P$.

The total input capacitance between the line conductors 5 and 6 of Figs. 1, 2, and 3 is the sum of the combined capacities of the capacitors 8 and 9 and the combined capacities of the capacitors 18 and 19. This input capacitance may be represented as $C_I$ and will be seen to be equal to $C_S + C_P$, where $$C_S = \frac{C_8 C_9}{C_8 + C_9}$$

and $$C_P = C_{18} + C_{19}$$

Thus, the input capacitance may be plotted by adding the ordinates of the curves $C_S$ and $C_P$ of Figs. 4 and 5. This addition is carried out at Fig. 6 where the curves $C_S$ and $C_P$ are taken from Figs. 4 and 5, respectively, and the curve $C_I$ represents the sum of the curves $C_S$ and $C_P$. It will now be evident from Fig. 6 that the variation of the parallel sum capacitance $C_P$ substantially neutralizes the opposite variation of the series sum capacitance $C_S$, so that the total input capacitance $C_I$ remains substantially constant throughout the range of movement of the capacitor plates. Fig. 6 shows that some variation of $C_I$ is occasioned by the fact that $C_S$ varies non-linearly, while $C_P$ varies substantially in a linear manner. However, Fig. 6 has been drawn for an entirely theoretical condition and, in practice, the zero points of the curves $C_S$ and $C_P$ are not so sharply defined as has been assumed in drawing Figs. 4 and 5. For example, in the embodiment of the invention shown at Fig. 2, the minimum capacity of the capacitors 18 and 19 at the center of the range of movement of the shaft 24 will usually be somewhat above zero due to the proximity of the moving plate 27 to both the stationary plates 20 and 22. Similarly, it is very difficult to reduce the capacitance of either of the capacitors 8 or 9 entirely to zero, especially where a common moving plate 26 is used as at Fig. 2. It will be understood, of course, that these conditions also prevail to a lesser extent in connection with the mechanically separate capacitors illustrated at Fig. 1.

At Fig. 7, I have shown a curve $C_S'$ representing the sum of the capacities of the capacitors 8 and 9 for conditions where the limiting values of $C_S'$ are somewhat above zero. Similarly, at Fig. 8 I have shown a curve $C_P'$ representing the sum of the capacities of the parallel connected capacitors 18 and 19 where the minimum capacity at the middle of the range of operation is somewhat above zero. At Fig. 9, I have plotted the sum of the curves $C_S'$ and $C_P'$ to illustrate the total input capacity $C_I'$ for these conditions. It will be evident from Fig. 9 that the total input capacity $C_I'$ is more nearly constant for the practical conditions illustrated at Figs. 7, 8, and 9 than for the purely theoretical conditions illustrated at Figs. 4, 5, and 6.

It will of course be understood that by varying the shapes of the capacitor plates capacity characteristics slightly different than those shown in connection with Figs. 1 and 2 may be obtained, and that by suitable proportioning a substantially unvarying net input capacitance may be obtained, or the net input capacitance may be caused to vary slightly in a desired manner.

At Fig. 10, I have shown a further embodiment of my invention where tfo capacitive voltage dividers of the type shown in Figs. 1, 2, or 3 are connected together by means of their variable voltage leads 11 to form a transmission line having substantially constant input and output capacities. It will be understood that the various elements of the circuit shown at Fig. 10 correspond electrically to those of Figs. 1, 2, or 3 and that like parts have been assigned like reference numerals. The pairs of capacitors 8, 9 and 18, 19 of Fig. 10 may be structurally separate, as at Fig. 1, or multiple in form, as at Fig. 2. The moving elements of all the capacitors of Fig. 10 are shown connected together and to a manually operable control member 25'.

While I have described only certain preferred embodiments of my invention by way of illustration, many further modifications will occur to those skilled in the art and I, therefore, wish to have it understood that I intend in the appended claims to cover all such modifications as fall within the true spirit and scope of my invention.

What I claim as new and desire to secure by Letters Patent of the United States, is:

1. A variable capacitive voltage divider comprising a pair of serially connected capacitors simultaneously variable in opposite senses over a predetermined range of variation and having a maximum sum capacitance in the region of the center of said range, a second pair of capacitors connected in parallel circuit relation with each other and with said serially connected capacitors, said second pair of capacitors being simultaneously variable in opposite senses over a predetermined range of variation and having a minimum sum capacitance at the region of the center of said range, and manually operable control means interconnecting said pairs of capacitors for simultaneous variation throughout said ranges.

2. A variable capacitive voltage divider comprising a source of alternating current supply, a pair of variable capacitors connected in series circuit relation across said source, control means for varying simultaneously and in opposite senses the capacities of said series connected capacitors from minimum to maximum over a predetermined range of operation of said control means, a second pair of capacitors connected in parallel circuit relation with respect to each other across said source, and means comprising said control means for varying simultaneously and in opposite senses the capacities of said parallel connected capacitors from maximum values at opposite limits of said range of operation to minimum values at the region of the center of said range.

3. A variable capacitive voltage divider comprising a source of alternating current supply, a pair of variable capacitors connected in series circuit relation across said source, movable control means for varying the capacities of said series capacitors in opposite senses from minimum to maximum values between the limits of a predetermined range of movement of said control means, a second pair of capacitors connected in parallel circuit relation with each other across said source, means connecting said control means to vary the capacity of each of said parallel connected capacitors from a minimum value at the center of said range of movement to a maximum value at one limit of said range while maintaining the capacity of the other of said parallel connected capacitors at its minimum value, and a variable voltage load circuit connected across one of said serially connected capacitors.

4. A variable capacitive voltage divider comprising a source of alternating current supply, a first pair of variable capacitors connected in series circuit relation across said source of supply and having a common movable element, manually operable control means for moving said element through a predetermined range of movement to vary the capacities of said serially connected capacitors in opposite senses from maximum to minimum values between the limits of said range of movement, a second pair of variable capacitors connected in parallel circuit relation across said source and having a second common movable element, and means connecting said second movable element for control by said manually operable means to vary the capacity of each of said parallel connected capacitors from a minimum value at the center of said range of movement to a maximum value at one end thereof while maintaining the capacity of the other of said parallel connected capacitors at a minimum value, whereby the total input capacity of said voltage divider is maintained substantially constant.

5. A variable capacitive voltage divider comprising a pair of mechanically interconnected capacitors oppositely variable over their operating range and connected in series circuit relation, a second pair of mechanically interconnected capacitors oppositely variable over different portions of their operating range and connected in parallel circuit relation, and control means interconnecting said pairs of capacitors for simultaneous capacitance variation.

ERNEST W. BISSON.